United States Patent
Knight et al.

(10) Patent No.: US 12,026,544 B2
(45) Date of Patent: Jul. 2, 2024

(54) SELF-PLAY TO IMPROVE TASK-ORIENTED DIALOG SYSTEMS AND METHODS

(71) Applicant: Beijing DiDi Infinity Technology and Development Co., Ltd., Beijing (CN)

(72) Inventors: Kevin Knight, Los Angeles, CA (US); Mariia Ryskina, Pittsburgh, PA (US); Arkady Arkhangorodsky, Los Angeles, CA (US); Ajay Nagesh, Los Angeles, CA (US); Scot Fang, Los Angeles, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 870 days.

(21) Appl. No.: 17/104,137

(22) Filed: Nov. 25, 2020

(65) Prior Publication Data

US 2022/0164225 A1 May 26, 2022

(51) Int. Cl.
*G06F 9/48* (2006.01)
*G06N 20/00* (2019.01)
*G10L 15/22* (2006.01)

(52) U.S. Cl.
CPC ........... *G06F 9/4881* (2013.01); *G06N 20/00* (2019.01); *G10L 15/22* (2013.01); *G10L 2015/223* (2013.01)

(58) Field of Classification Search
CPC ...... G06F 9/4881; G06N 20/00; G06N 3/092; G10L 2015/223
See application file for complete search history.

(56) References Cited

U.S. PATENT DOCUMENTS

| | | | |
|---|---|---|---|
| 2010/0058366 A1* | 3/2010 | Swildens | G06F 9/541 719/329 |
| 2012/0124039 A1* | 5/2012 | Sandholm | G06Q 30/0611 705/26.4 |
| 2019/0115027 A1* | 4/2019 | Shah | G10L 17/22 |
| 2020/0250575 A1* | 8/2020 | Ie | G06N 5/043 |

OTHER PUBLICATIONS

Shah, Pararth, et al. "Bootstrapping a neural conversational agent with dialogue self-play, crowdsourcing and on-line reinforcement learning." Proceedings of the 2018 Conference of the North American Chapter of the Association for Computational Linguistics: Human Language Technologies, vol. 3, 2018. (Year: 2018).*

(Continued)

*Primary Examiner* — Eric Nilsson
(74) *Attorney, Agent, or Firm* — Sheppard Mullin Richter & Hampton LLP

(57) ABSTRACT

An automatic agent may be trained using reinforcement learning. A secret task may be obtained for a simulated user, and the secret task may be unknown to the automatic agent. At least one instruction to complete the secret task may be obtained from the simulated user according to at least one RL policy. At least one action may be generated by the automatic agent based on the at least one instruction and the at least one RL policy. Rewards may be determined for the simulated user and the automatic agent in response to determining that the at least one action successfully completes the secret task. The at least one RL policy may be adjusted based on the determined rewards.

18 Claims, 5 Drawing Sheets

(56) References Cited

OTHER PUBLICATIONS

Majumdar, Sourabh, Serra Sinem Tekiroglu, and Marco Guerini. "Generating challenge datasets for task-oriented conversational agents through self-play." arXiv preprint arXiv:1910.07357 (2019). (Year: 2019).*
Kang, Dongyeop, et al. "Recommendation as a communication game: Self-supervised bot-play for goal-oriented dialogue." arXiv preprint arXiv:1909.03922 (2019). (Year: 2019).*
Li, Jiwei, et al. "Deep reinforcement learning for dialogue generation." arXiv preprint arXiv:1606.01541 (2016). (Year: 2016).*
Pawel Budzianowski et al., "MultiWOZ—a large-scale multi-domain Wizard-of-Oz dataset for task-oriented dialogue modelling", Proceedings of the 2018 Conference on Empirical Methods in Natural Language Processing, Brussels, Belgium, Oct. 31-Nov. 4, 2018, pp. 5016-5026.
Jacob Devlin et al., "Bert: Pre-training of Deep Bidirectional Transformers for Language Understanding", arXiv:1810.04805v2 [cs.CL] May 24, 2019.
Layla El Asri et al., "Frames: a corpus for adding memory to goal-oriented dialogue systems", 2017, Proc. SIGDIAL, arXiv:1704.00057v2 [cs.CL] Apr. 13, 2017.
Alec Radford et al., "Language models are unsupervised multitask learners", 2019.
Tsung-Hsien Wen et al., "A network-based End-to-End Trainable Task-oriented Dialogue System", 2017, Proc. EACL, arXiv:1604.04562v3 [cs.CL] Apr. 24, 2017.
Antoine Bordes et al., "Learning end-to-end goal-oriented dialog", arXiv:1605.07683v4 [cs.CL] Mar. 30, 2017.
Bhuwan Dhingra et al., "End-to-End Reinforcement Learning of Dialogue Agents for Information Access", arXiv:1609.00777v2 [cs.CL] Oct. 31, 2016.
Mihail Eric et al., "Key-value retrieval networks for task-oriented dialogue", ArXiv:1705.05414v2 [cs.CL] Jul. 14, 2017.
Miguel Espla-Gomis et al., "Paracrawl: Web-scale parallel corpora for the languages of the EU", Proceedings of MT Summit XXII, vol. 2, Dublin, Aug. 19-23, 2019, pp. 118-119.
Norman M. Fraser et al., "Simulating Speech Systems", 1991, Computer Speech & Language, 5(1):81-99.
A.G. Hauptmann, "Speech and gestures for graphic image manipulation", CHI'89 Proceedings, May 1989, pp. 241-245.
Matthew Henderson et al., "The second dialog state tracking challenge", 2014, In Proc. SIGDIAL.
William J. Hutchins et al., "An Introduction to Machine Translation", Table of Contents, 1992, Academic Press.

Daniel Jurafsky et al., "Speech and Language Processing", Second Edition, Chapter I: Introduction, Chapter 24: Chatbot & Dialogue Systems, 2020.
J.F. Kelley, "An Iterative Design Methodology for User-Friendly Natural Language Office Information Applications", 1984, ACM Trans. Inf. Syst., 2:26-41.
Dara Kerr, "Uber Dials it Back 20 Years, Bringing its Ride Service to Feature Phones", 2020, CNET. Feb. 13, 2020. https://cnet.co/3fPG7rC.
Philipp Koehn et al., "Moses: Open Source Toolkit for Statistical Machine Translation", Proceedings of the ACL 2007 Demo and Poster Sessions, Jun. 2007, Prague, pp. 177-180.
Xiujun Li et al., "End-to-End Task-Completion Neural Dialogue Systems", arXiv:1703.01008v4 [cs.CL] Feb. 11, 2018.
Abhinav Rastogi et al., "Towards Scalable Multi-Domain Conversational Agents: The Schema-Guided Dialogue Dataset", arXiv:1909.05855v2 [cs.CL] Jan. 29, 2020.
Verena Rieser et al., "A Corpus Collection and Annotation Framework for Learning Multimodal Clarification Strategies", 2005, In Proc. SIGDIAL.
Pararth Shah et al., "Bootstrapping a Neural Conversational Agent with Dialogue Self-Play, Crowdsourcing and On-Line Reinforcement Learning", 2018, In Proc. NAACL-HLT.
Ilya Sutskever et al., "Sequence to Sequence Learning with Neural Networks", arXiv:1409.3215v3 [cs.CL] Dec. 14, 2014.
Ashish Vaswani et al., "Attention is All You Need", arXiv:1706.03762v5 [cs.CL] Dec. 6, 2017.
Wei Wei et al., "AirDialogue: An Environment for Goal-Oriented Dialogue Research", Proceedings of the 2018 Conference on Empirical Methods in Natural Language Processing, Brussels, Belgium, Oct. 31-Nov. 4, 2018, pp. 3844-3854.
Jason D. Williams et al., "The Dialog State Tracking Challenge Series", AI Magazine, Competition Reports, Winter 2014, pp. 121-124.
Jason D. Williams et al., "End-to-End LSTM-Based Dialog Control Optimized with Supervised and Reinforcement Learning", arXiv:1606.01269v1 [cs.CL] Jun. 3, 2016.
Thomas Wolf et al., "Huggingface's Transformers: State-of-the-Art Natural Language Processing", arXiv:1910.03771v5 [cs.CL] Jul. 14, 2020.
Yizhe Zhang et al., "DialoGPT: Large-Scale Generative Pre-training for Conversational Response Generation", ar.Xiv:1911.00536v3 [cs.CL] May 2, 2020.
Tiancheng Zhao et al., "Towards End-to-End Learning for Dialog State Tracking and Management Using Deep Reinforcement Learning", arXiv:1606.02560v2 [cs.AI] Sep. 15, 2016.

* cited by examiner

SELF-PLAY TO IMPROVE TASK-ORIENTED DIALOG SYSTEMS AND METHODS

TECHNICAL FIELD

The disclosure relates generally to training an automatic agent using reinforcement learning. After the automatic agent is trained, it may interact with human users.

BACKGROUND

Human-machine interaction models may learn to perform simple actions in a human-like way. These models may be trained based on man-made rules, or by interacting with an environment and receiving feedbacks from the environment. However, directly interacting with the real-world environment may be expensive and impractical in many scenarios. This application discloses a self-training automatic agent for responding to human instructions.

SUMMARY

Various embodiments of the specification include, but are not limited to, systems, methods, and non-transitory computer readable media for training an automatic agent.

In various implementations, a method may include obtaining a secret task for a simulated user, wherein the secret task is unknown to the automatic agent. The method may further include obtaining, from the simulated user according to at least one reinforcement learning (RL) policy, at least one instruction to complete the secret task. The method may further include generating, by the automatic agent, at least one action based on the at least one instruction and the at least one RL policy. The method may further include determining rewards for the simulated user and the automatic agent in response to determining that the at least one action successfully completes the secret task, and adjusting the at least one RL policy based on the determined rewards.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include obtaining a secret task for a simulated user, wherein the secret task is unknown to the automatic agent. The operations may further include obtaining, from the simulated user according to at least one reinforcement learning (RL) policy, at least one instruction to complete the secret task. The operations may further include generating, by the automatic agent, at least one action based on the at least one instruction and the at least one RL policy. The operations may further include determining rewards for the simulated user and the automatic agent in response to determining that the at least one action successfully completes the secret task, and adjusting the at least one RL policy based on the determined rewards.

Yet another aspect of the present disclosure is directed to a non-transitory computer-readable storage medium configured with instructions executable by one or more processors to cause the one or more processors to perform operations. The operations may include obtaining a secret task for a simulated user, wherein the secret task is unknown to the automatic agent. The operations may further include obtaining, from the simulated user according to at least one reinforcement learning (RL) policy, at least one instruction to complete the secret task. The operations may further include generating, by the automatic agent, at least one action based on the at least one instruction and the at least one RL policy. The operations may further include determining rewards for the simulated user and the automatic agent in response to determining that the at least one action successfully completes the secret task, and adjusting the at least one RL policy based on the determined rewards.

In some embodiments, the secret task may include traveling to a target destination, and the at least one instruction may include a plurality of tokens of simulated user input. The at least one action may include determining, by the automatic agent, a predicted destination based on one or more of the plurality of tokens of the simulated user input, and determining, by the automatic agent, to travel to the predicted destination. The at least one action may successfully complete the secret task when the predicted destination matches the target destination.

In some embodiments, the at least one action further may include determining, by the automatic agent, a response template for a reply to the at least one instruction based on one or more of the plurality of tokens of the simulated user input. An Application Programming Interface (API) call and one or more parameters for the API call may be determined by the automatic agent, and the one or more parameters may be based on one or more of the plurality of tokens of the simulated user input. The reply to the at least one instruction may be sent by the automatic agent to the simulated user, based on the response template and a response from the API call.

In some embodiments, the response from the API call may include a latitude and longitude of the predicted destination.

In some embodiments, the automatic agent may be penalized for each additional communication to the simulated user after the reply to the at least one instruction.

In some embodiments, a dialog of the plurality of tokens of the simulated user input and the reply from the automatic agent may be stored.

In some embodiments, the simulated user and the automatic agent may be rewarded with bonus rewards based on a degree of similarity between the dialog and previously collected human/human dialogs.

In some embodiments, the simulated user and the automatic agent may be penalized in response to determining that the at least one instruction corresponds to an incorrect task that is different from the secret task.

In some embodiments, the simulated user may be penalized in response to determining that the at least one instruction comprises two consecutive instructions without a reply from the automatic agent in between the two consecutive instructions.

In some embodiments, the at least one action may include a sequence of simulated button pushes.

In some embodiments, the automatic agent may be deployed to receive at least one human instruction from a human user. At least one real action may be generated by the automatic agent based on the at least one human instruction.

In some embodiments, the at least one RL policy may include a joint RL policy that is adjusted based on both the at least one instruction from the simulated user and the at least one action by the automatic agent.

In some embodiments, the at least one RL policy may include: a user RL policy that is adjusted based on the at least one instruction from the simulated user, and an agent RL policy that is adjusted based on the at least one action by the automatic agent.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
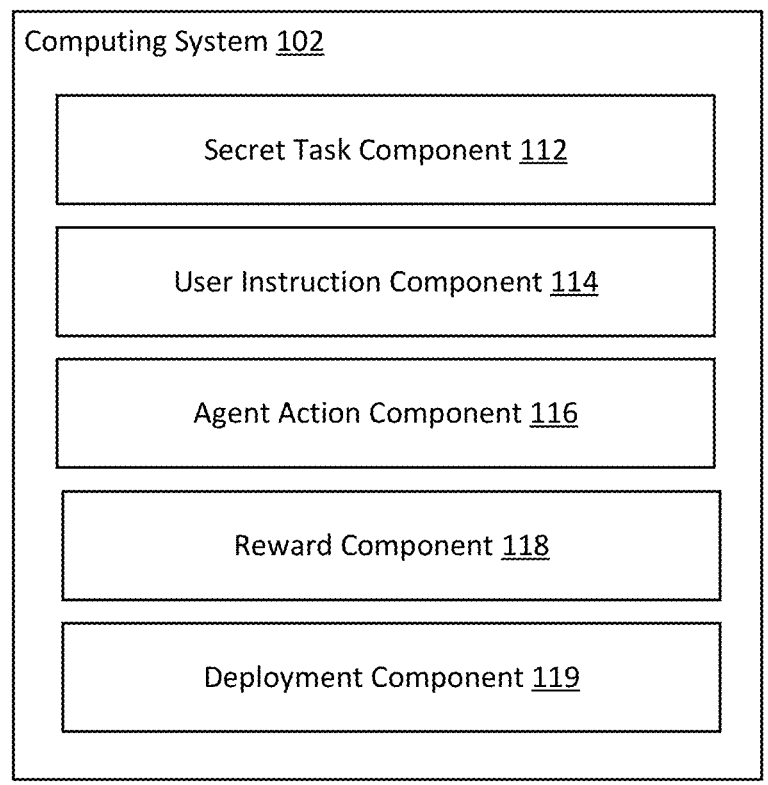
FIG. 1 illustrates an exemplary system to which techniques for training a simulated user and an automatic agent may be applied, in accordance with various embodiments.
Figure 1:
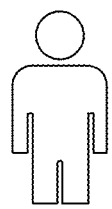

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may train a simulated (i.e. automatic) user and an automatic agent using reinforcement learning. After the automatic agent is trained, it may have conversation-like interactions with human users. For example, reinforcement learning may be used to teach the automatic agent how to participate in a task-oriented dialog inside a "push button" dialog environment that includes utterance templates and API calls. In some embodiments, the learning may be steered towards "human like" dialog strategies, so that learned agents can subsequently interact correctly with humans and solve their problems.

In some embodiments, an (initially random-behaving) automatic agent and an (initially random-behaving) simulated user may be dropped into the same environment (e.g., a representation of an interface). The simulated user may be given a secret task (e.g., travel to a destination, ask about the weather), and its goal may be to transmit the secret task to the automatic agent (e.g., through natural language dialog, by "pushing" buttons in the interface). The agent and user may both be rewarded if the automatic agent successfully completes the secret task (e.g., drives the user to the correct location, provides information about the weather). If the secret task is not successfully completed, a reward might not be given, or a penalty may be applied.

At the beginning of the training, the automatic agent and simulated user may behave randomly and not successfully complete the secret task (i.e., receive no reward). This random behavior may include transmitting random messages and taking random actions (e.g., pushing random buttons in the interface). However, the automatic agent and simulated user may eventually stumble upon sequences of messages and actions that achieve the goal. For example, the user may say "I want to go to Starbucks", the agent may look up Starbucks using a map API and determine its address and lat/long, confirm the address with the user, then drive to the lat/long. The automatic agent and simulated user may learn to steer themselves toward successful actions. The task may be for the agent to determine the lat/long address of where the user want to go, and to arrange a shared-ride car to take the user there. The agent may select utterance templates (e.g., by clicking buttons in the interface), such as "X is Y minutes away" and select to fill the parameters. The agent may additionally make API calls, such as to find information about Starbucks, that may provide the agent with additional selectable information (e.g., display more clickable information).

FIG. 1 illustrates an exemplary system 100 to which techniques for training a simulated user and an automatic agent, in accordance with various embodiments. The example system 100 may include a computing system 102 and a user 104. It is to be understood that although one user is shown in FIG. 1, any number of users may be included in the system 100. The computing system 102 may include a ride-sharing application, an artificial-intelligent assistant, an autonomous driving car, or another suitable smart device. In some embodiments, communications 122 may include instructions from the user 104 and replies from the computing system 102.

Computing system 102 may be implemented in one or more devices, one or more networks (e.g., enterprise networks), one or more endpoints, one or more servers, or one or more clouds. The one or more servers may include hardware or software which manages access to a centralized resource or service in a network. A cloud may include a cluster of servers and other devices which are distributed across a network. The one or more devices may include a mobile phone, tablet, server, desktop computer, laptop computer, etc. The computing devices may be associated with one or more vehicles (e.g., car, truck, boat, train, autonomous vehicle, electric scooter, electric bike, etc.). The computing devices may be implemented as an in-vehicle computer or as a mobile phone used in association with the one or more vehicles. The computing system 102 may communicate with other computing devices. Communication between devices may occur over the internet, through a local network (e.g., LAN), or through direct communication (e.g., BLUETOOTH™, radio frequency, infrared).

In some embodiments, the system 100 may include a ridesharing platform. The ridesharing platform may facilitate transportation service by connecting drivers of vehicles with passengers. The platform may accept requests for transportation from passengers, identify idle vehicles to fulfill the requests, arrange for pick-ups, and process trans-actions. For example, passenger 104 may order a trip. The trip order may be included in communications 122. The computing system 102 may include a software application, a web application, an API, or another suitable interface associated with the ridesharing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include a secret task component 112, a user instruction component 114, an agent action component 116, and a reward component 118. In some embodiments, the computing system 102 may include a deployment component 119. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

The secret task component 112 may be configured to obtain a secret task for a simulated user. The secret task may be unknown to an automatic agent, and may be obtained from a simulated user, an administrator, or a storage location. Obtaining information may include one or more of accessing, acquiring, analyzing, determining, examining, identifying, loading, locating, opening, receiving, retrieving, reviewing, storing, or otherwise obtaining the information. For example, the simulated user may generate the secret task randomly, or the secret task may be selected from a stored list of secret tasks. In some embodiments, the secret task may include traveling to a target destination (e.g., street address, latitude longitude pair).

The user instruction component 114 may be configured to obtain at least one instruction to complete the secret task. The at least one instruction may be obtained from the simulated user according to at least one reinforcement learning (RL) policy. In some embodiments, the at least one instruction may include a plurality of tokens of simulated user input. For example, the simulated user input may include simulated speech or simulated typed text. The tokens may be obtained by tokenizing input from the simulated user by splitting each word or phrase into a separate variable. In some embodiments, multiple instructions may be obtained. For example, the multiple instructions may be part of a dialog between the simulated user and the automatic agent.

The agent action component 116 may be configured to generate at least one action based on the at least one instruction and the at least one RL policy. The agent action component 116 may include the automatic agent, and the at least one action may be generated by the automatic agent. In some embodiments, the at least one action may include the automatic agent determining a predicted destination based on one or more of the plurality of tokens of the simulated user input. The at least one action may further include the automatic agent determining to travel to the predicted destination.

In some embodiments, the at least one action may include replying to the simulated user. For example, the reply may be part of a dialog between the simulated user and the automatic agent. In some embodiments, the at least one action may include determining a response template for a reply to the at least one instruction by the automatic agent based on one or more of the plurality of tokens of the simulated user input. In order to fill in the response template, the automatic agent may determine an Application Programming Interface (API) call and one or more parameters based on one or more of the plurality of tokens of the simulated user input. The reply to the at least one instruction may be sent from the automatic agent to the simulated user based on the response template and a response from the API call. In some embodiments, the response from the API call may include a latitude and longitude of the predicted destination. In some embodiments, the at least one action may include a sequence of simulated button pushes. For example, the sequence of simulated button pushes mimic a human agent interacting with push button graphical user interface (GUI).

The reward component 118 may be configured to determine rewards for the simulated user and the automatic agent in response to determining that the at least one action successfully completes the secret task. When the secret task include traveling to a target destination, it may be determined that the at least one action successfully completes the secret task when the predicted destination matches the target destination. Rewarding the simulated user and the automatic agent may be part of a reinforcement learning process used to train the simulated user and the automatic agent.

The reward component 118 may be further be configured to adjust the at least one RL policy based on the determined rewards. In some embodiments, the at least one RL policy may include a joint RL policy that is trained based on the at least one instruction from the simulated user, the at least one action by the automatic agent, and the determined rewards. For example, a joint reward may be determined in response to determining that the at least one action successfully completes the secret task. In some embodiments, the at least one RL policy may include a user RL policy that is trained based on the at least one instruction from the simulated user and the determined rewards, and an agent RL policy that is adjusted based on the at least one action by the automatic agent and the determined rewards. For example, a user specific reward may be determined based on the at least one instruction from the simulated user and whether the at least one action by the automatic agent successfully completes the secret task. An agent specific reward may be determined based on the at least one action by the automatic agent and whether the at least one action by the automatic agent successfully completes the secret task.

In some embodiments, the at least one RL policy may be adjusted based on reward-shaping in order to achieve a more human-like conversation. In some embodiments, the simulated user and the automatic agent may be penalized in response to determining that the at least one instruction corresponds to an incorrect task that is different from the secret task. This may prevent the automatic agent and simulated user from conspiring to learn a "secret language" that is incompatible with humans. For example, they may decide that when the user says "I want to go to Location A", they really mean "I want to go to Location B", and the automatic agent will drive them to Location B. This is bad, because this automatic agent cannot be deployed to solve real human users' problems. When a human says they want to go to Location A, they mean they really want to go to Location A.

In some embodiments, reward-shaping may be used by introducing penalties for agents when they talk over each other. In some embodiments, the simulated user may be penalized in response to determining that the at least one instruction comprises two consecutive instructions without a reply from the automatic agent in between two consecutive instructions. This may prevent the automatically-trained agent and simulated user from filling the conversation with nonsense utterances, because otherwise, there would be a penalty in doing so.

In some embodiments, the reinforcement learning may be steered toward dialogs that not only achieve the secret task, but also are compatible with human conversation. For example, the automatic agent and simulated user may be exposed to previously collected human/human dialogs, and rewarded for responding in similar ways. In some embodiments, a dialog of the plurality of tokens of simulated user input and the reply from the automatic agent may be stored. In some embodiments, the simulated user and the automatic agent may be rewarded with bonus rewards based on a degree of similarity between the dialog and previously collected human/human dialogs. In some embodiments, the automatic agent may be penalized for each additional communication to the simulated user after the reply to the at least one instruction. This may prevent the automatic agent from overconforming the target task in an unhuman way.

In some embodiments, the dialog may be logged as fully-executable Python code. If the session log file is run, a faithful reply of the session may be obtained, in which the same APIs are called, and the same messages are formed. Pieces of code in a session log may respond to user instructions in the same way that the agent did. An automatic agent may be taught to create and select relevant pieces of code (or equivalently, clicks) in new dialog contexts.

In some embodiments, the deployment component 119 may be configured to deploy the automatic agent to receive at least one human instruction from a human user. In some embodiments, at least one real action may be generated by the automatic agent based on the at least one human instruction. In some embodiments, a shared-ride vehicle may be ordered using a speech-only dialog system. For example, a shared-ride car may be ordered using a virtual AI assistant. In another example, a rider may step into an autonomous vehicle (e.g., taxi) and tell the vehicle where to go. The system's goal may include extracting a latitude longitude pair from the user, through natural conversation. Another goal may include assuring the user that the guessed latitude longitude pair is indeed correct, before the vehicle performs any final action. This assurance must also be accomplished through natural conversation. The final output of the dialog may include a latitude longitude pair of a destination.

Figure 2:
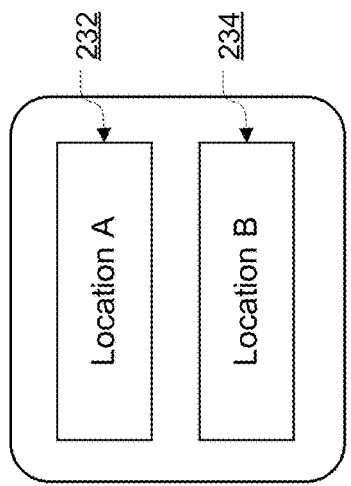
FIG. 2 illustrates an exemplary simplified environment, in accordance with various embodiments.

FIG. 2 illustrates an exemplary simplified environment 200 of a scaled-down destination-specification task domain, in accordance with various embodiments. In some embodiments, the simplified environment 200 may be limited to only two places in the virtual world 230, Location A 232 and Location B 234. For example, there may be no streets, cities, or ratings. Simulated User 210 may have five Possible Actions 212. The Possible Actions 212 may include deciding to go to Location A, deciding to go to Location B, saying "I want to go to Location A", saying "I want to go to Location B", and waiting for the automatic agent. Automatic Agent 220 may have two Possible Actions 222. The Possible Actions 222 may include driving to Location A, and driving to Location B. In some embodiments, the Possible Actions 222 may include replies to communications from the Simulated User 210.

In some embodiments, simplified environment 200 may be used in multiple reinforcement learning episodes. An episode may include a sequence of user and agent actions (i.e., a dialog). An episode may be successful if the agent drives the user to where the user wants to go. In an exemplary episode, Simulated User 210 may choose and execute Possible Actions 212 until "Wait for automatic agent" is executed, or until a timeout of 4 actions. Then, Automatic Agent 220 may select one of Possible Actions 222. The episode may end after one of Possible Actions 222 is selected.

In some embodiments, a simulated user may have a mapping function $f$ that probabilistically decides which action to take based on the context (i.e., the sequence of prior actions by the simulated user and automatic agent). In some embodiments, an automatic agent may have a mapping function g that decides which action to take, based on the prior sequence of communications from the simulated user and actions by the automatic agent. For example, the automatic agent may not know or use the secret decisions of the simulated user.

An episode may be successful if both (a) the automatic user (User) decided on at least one destination in their sequence, and (b) the User got taken to the most recently decided destination by the automatic agent (Agent). An exemplary dialog from a successful episode may include:

User: Mentally decide to go Location A
User: Say out loud "I want to go to Location A"
User: Wait for agent
Agent: Drive to Location A
Success? YES An exemplary dialog from an unsuccessful episode may include:

User: Say "I want to go to Location A" /* babbling without a destination */
User: Decide to go to Location B /* User decides destination */
User: Decide to go to Location A /* User changes their mind */
User: Say "I want to go to Location B" /* User says the wrong destination */
User: Wait for agent
Agent: Drive to Location B /* Agent drives User to the wrong place */
Success? NO This exemplary episode was unsuccessful because, while the Agent drove the User to the location specified in the last message from the User, the Agent did not drive the User to the most recently decided destination (i.e., Location A). Another exemplary dialog from an unsuccessful episode may include:

User: Say "I want to go to Location A"
User: Wait for agent
Agent: Drive to Location A
Success? NO This exemplary episode was unsuccessful because the User never mentally decided on a destination. As a result, there is no way to check if the Agent drove to the right place. In some embodiments, the automatic agent and the simulated user may start with a random uniform action selection. In simplified environment 200, they may initially get 32% successful dialogs. As the automatic agent and the simulated user train with reinforcement learning, they may develop non-random action functions that yield more and more successful dialogs, eventually reaching 100% successful dialogs.

In some embodiments, a destination may be provided to the simulated user. For example:
Start: Destination is Location B
User: Say "I want to go to Location B"
User: Decide to go to Location B /* this action is actually unnecessary */
User: Wait for agent
Agent: Drive to Location B
Success? YES /* reward user and agent */

As discussed above in relation to the reward component 118, the automatic agent and the simulated user may conspire to learn a "secret language." For example, the secret language may include: if the user says "I want to go to Location A" once, then the agent drives to Location A. But, the secret language may also include: if the user says "I want to go to Location A" more than once, then the agent should drive to Location B. A first exemplary dialog based on this secret language may be "human":
Start: Destination is Location A
User: Say "I want to go to Location A"
User: Wait for agent
Agent: Drive to Location A
Success? YES /* reward user and agent */

However, a second exemplary dialog based on this secret language may be "inhuman":
Start: Destination is Location B
User: Say "I want to go to Location A"
User: Say "I want to go to Location A"
Agent: Drive to Location B
Success? YES /* the user and agent would be rewarded*/

This exemplary episode is successful (the User is taken to right place) and would result in a reward if extra conditions are not put in place. This type of "inhuman" strategy should be avoided, because human user would not use this language when interacting with the automatic agent.

Figure 3:
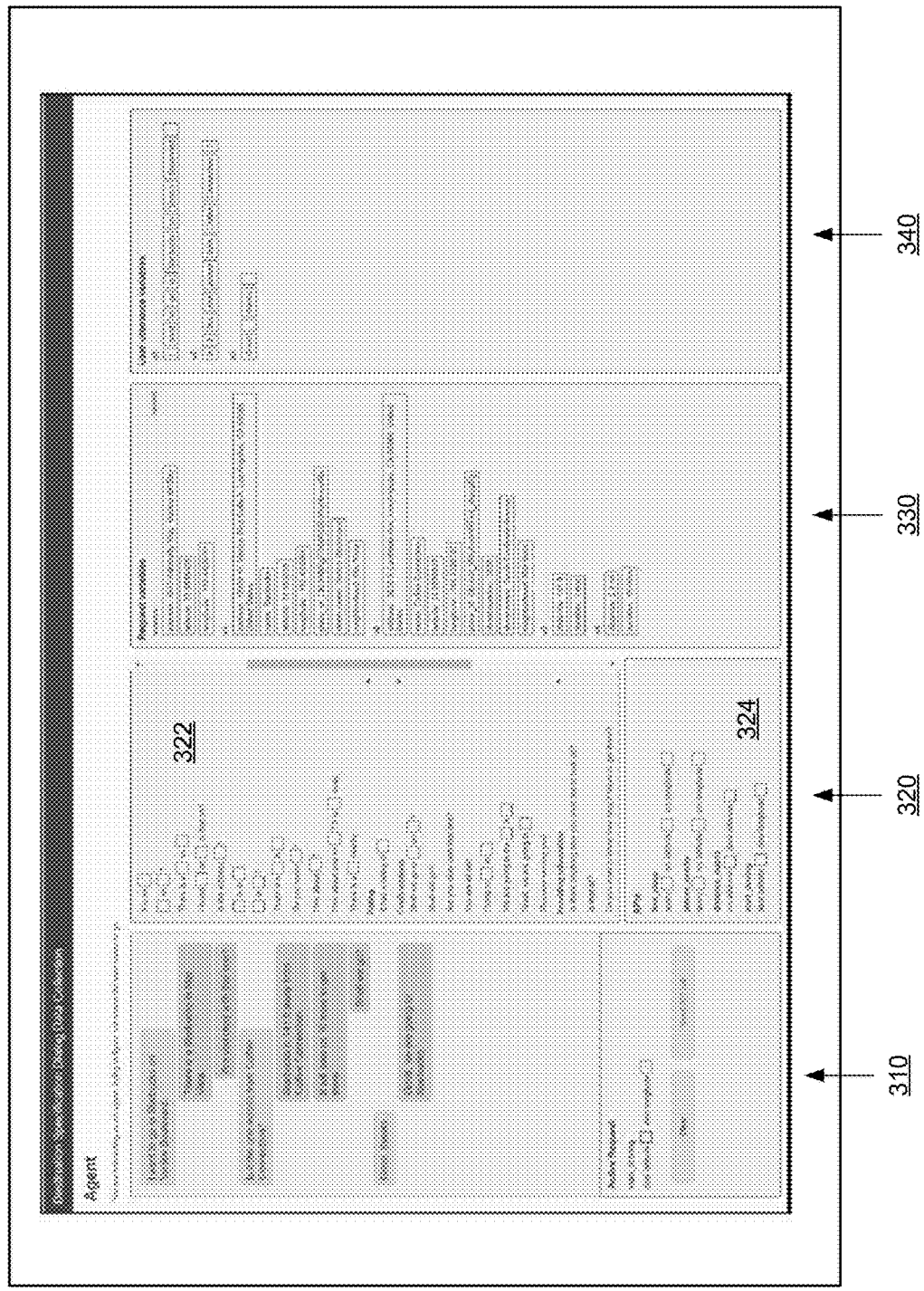
FIG. 3 illustrates exemplary push button interface, in accordance with various embodiments.

FIG. 3 illustrates exemplary push button interface 300, in accordance with various embodiments. In some embodiments, the automatic agent may be trained to mimic a human agent interacting with push button interface 300. In some embodiments, a human agent may respond to a human user with push button interface 300 to collect natural language dialogs in a task-oriented domain. The automatic agent may be built using machine learning techniques by analyzing the collected dialogs. The automatic agent may try to click the same buttons as the human agent, when similar situations arise. However, this may require a very large number of dialogs to be collected. In many situations, it is not practical to collect enough dialogs to support effective machine learning. In some embodiments, the automatic agent and simulated user may train themselves with reinforcement learning, in a completely unsupervised way. Thus, this learning method is not limited by the number of human/human dialogs collected.

The push button interface 300 may constrain the agent's actions and utterances. The first panel 310 may show a chat with a user. The second agent panel 320 may show the agent's available actions, including utterance templates 322 and API calls 324. Results of API calls may be shown in the third agent panel 330, and tokenized user utterances may be shown in the fourth agent panel 340.

In some embodiments, agent actions may be restricted to a sequence of clicks. For example, after the user types "I want to go to Starbucks on Venice Boulevard", the agent may perform the following sequence of actions. First, the agent may click on find_place API from Google. This API takes a string argument and a source latitude longitude pair. The agent may then click on the words "Starbucks", "Venice", and "Boulevard" in the fourth panel, and click on the source latitude longitude pair in the third panel. This may call the find_place API in real-time and further populate the third panel with its result, collected under v1. Next, the agent may click on the distance_matrix API. This API may take two addresses, and return the time and distance between them. The agent may click on the address field of variable v1 (e.g., Starbucks), the click on the address field of source. This may call the distance_matrix API and further populate the third panel. Next, the agent may click on the template "{ } on { } is { } minutes away." This template may take three arguments. The agent may click on the name field of variable v1 (e.g., "Starbucks"), the street name field of variable v1 (e.g., "Venice Boulevard"), and the duration field of variable v2. Finally, the agent may click on the template "Shall we go?" These 11 clicks may result in sending the following response to the user: "Starbucks on Venice Boulevard is 10 minutes away. Shall we go?"

In some embodiments, an agent may click on "+" at any time to make a new utterance template, which then may be made available to all agents. The constrained interface may allow all of the agent's actions, not just their words, to be logged and made available for analysis. No additional dialog annotations may be required from agents or users. In some embodiments, push button interface 300 may be used to respond to users' questions about the weather.

Figure 4:
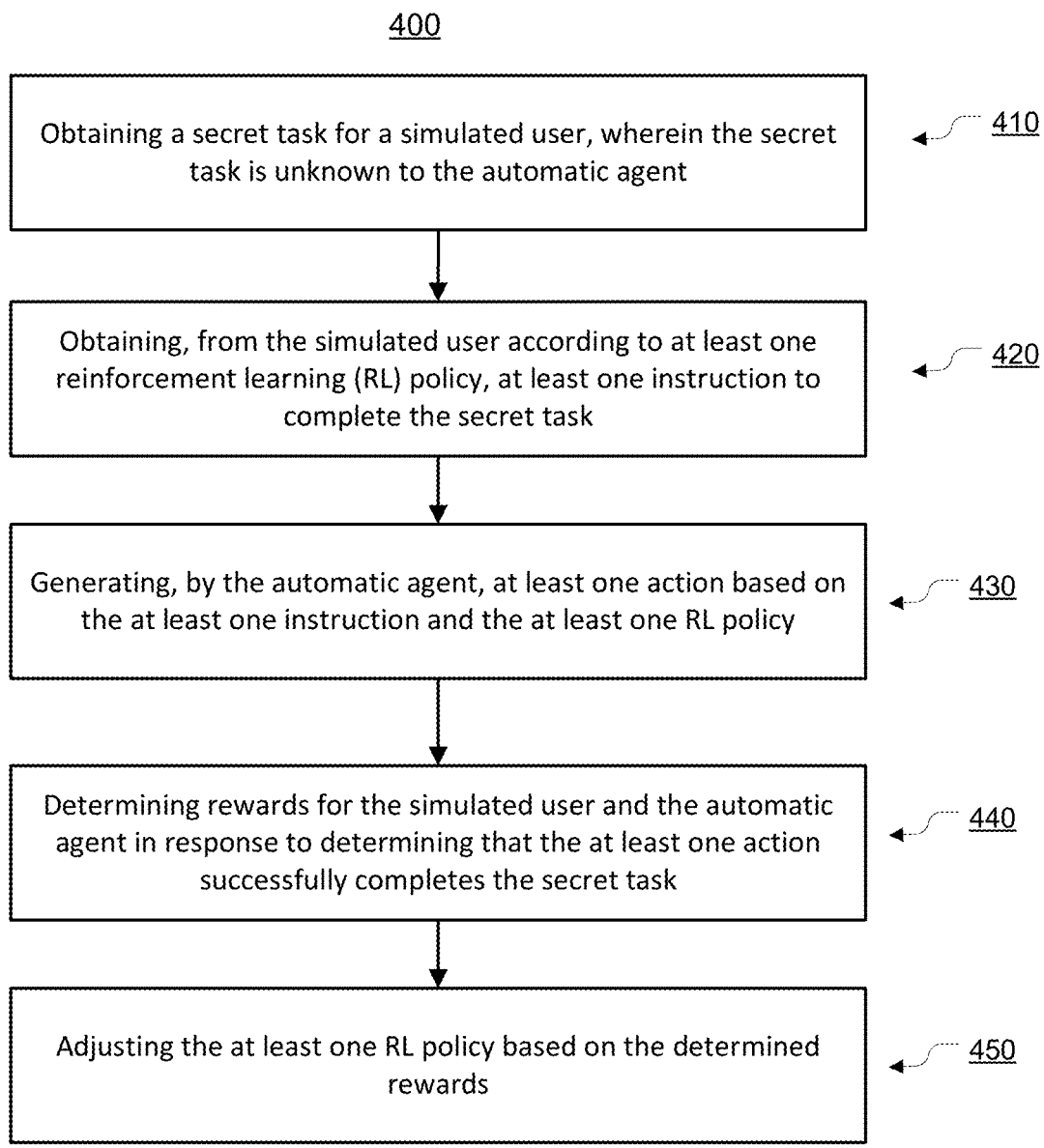
FIG. 4 illustrates a flowchart of an exemplary method, according to various embodiments of the present disclosure.

FIG. 4 illustrates a flowchart of an exemplary method 400, according to various embodiments of the present disclosure. The method 400 may be implemented in various environments including, for example, the system 100 of FIG. 1. The method 400 may be performed by computing system 102. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 410, a secret task may be obtained for a simulated user, and the secret task may be unknown to the automatic agent. At block 420, at least one instruction to complete the secret task may be obtained from the simulated user according to at least one RL policy. At block 430, at least one action may be generated by the automatic agent based on the at least one instruction and the at least one RL policy. At block 440, rewards may be determined for the simulated user and the automatic agent in response to determining that the at least one action successfully completes the secret task. At block 450, the at least one RL policy may be adjusted based on the determined rewards.

Figure 5:
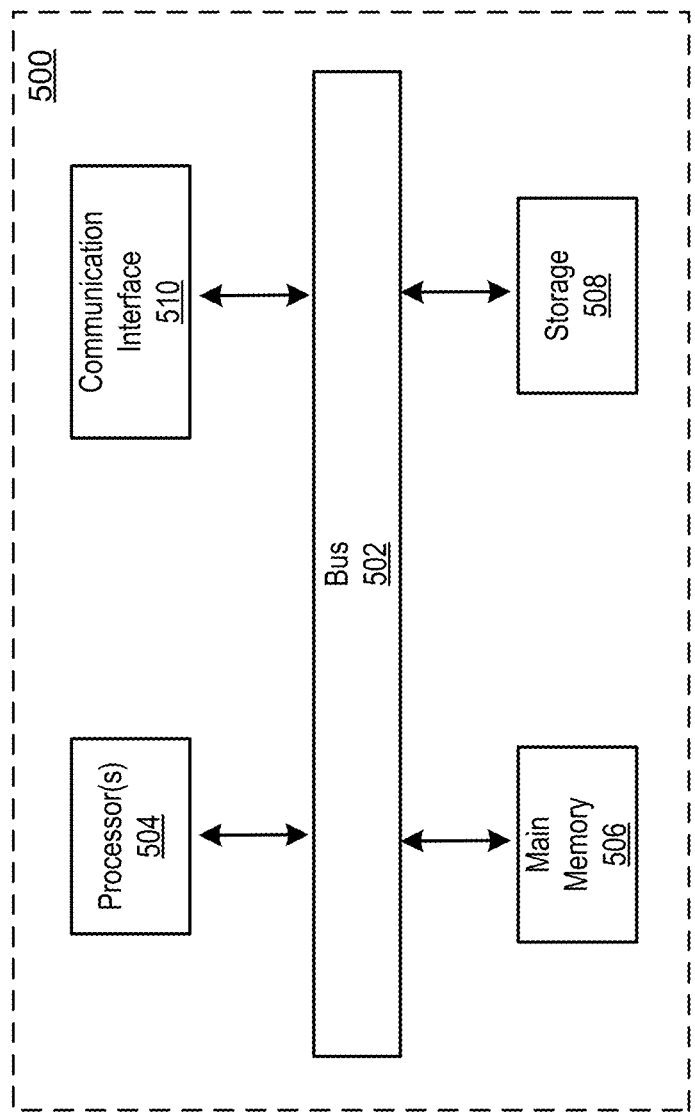
FIG. 5 is a block diagram that illustrates a computer system upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general-purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102 or one or more components of the computing system 102 shown in FIG. 1. As another example, the process/method shown in FIG. 4 and described in connection with this figure may be implemented by computer program instructions stored in main memory 506. When these instructions are executed by processor(s) 504, they may perform the steps as shown in FIG. 4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for training an automatic agent, comprising:
    obtaining a secret task for a simulated user, wherein the secret task is unknown to the automatic agent;
    obtaining, from the simulated user according to a user-side reinforcement learning (RL) policy, at least one instruction to complete the secret task;
    generating, by the automatic agent, at least one action based on the at least one instruction and an agent-side RL policy;
    determining rewards for the simulated user and the automatic agent in response to determining that the at least one action successfully completes the secret task, wherein the rewards comprise a user-side reward determined based on the at least one instruction and whether the at least one action successfully completes the secret task, and an agent-side reward determined based on the at least one action and whether the at least one action successfully completes the secret task; and
    adjusting the user-side RL policy based on the user-side reward and adjusting the agent-side policy based on the agent-side reward.

2. The method of claim 1, wherein:
    the secret task comprises traveling to a target destination;
    the at least one instruction comprises a plurality of tokens of simulated user input;
    the at least one action comprises:
    determining, by the automatic agent, a predicted destination based on one or more of the plurality of tokens of the simulated user input; and
    determining, by the automatic agent, to travel to the predicted destination; and
    the at least one action successfully completes the secret task when the predicted destination matches the target destination.

3. The method of claim 2, wherein the at least one action further comprises:

determining, by the automatic agent, a response template for a reply to the at least one instruction based on one or more of the plurality of tokens of the simulated user input;

determining, by the automatic agent, an Application Programming Interface (API) call and one or more parameters for the API call, wherein the one or more parameters are based on one or more of the plurality of tokens of the simulated user input; and sending, by the automatic agent to the simulated user, the reply to the at least one instruction based on the response template and a response from the API call.

4. The method of claim 3, wherein the response from the API call comprises a latitude and longitude of the predicted destination.

5. The method of claim 3, further comprising:
penalizing the automatic agent for each additional communication to the simulated user after the reply to the at least one instruction.

6. The method of claim 3, further comprising:
storing a dialog of the plurality of tokens of the simulated user input and the reply from the automatic agent.

7. The method of claim 6, further comprising:
rewarding the simulated user and the automatic agent with bonus rewards based on a degree of similarity between the dialog and previously collected human/human dialogs.

8. The method of claim 1, further comprising:
penalizing the simulated user and the automatic agent in response to determining that the at least one instruction corresponds to an incorrect task that is different from the secret task.

9. The method of claim 1, further comprising:
penalizing the simulated user in response to determining that the at least one instruction comprises two consecutive instructions without a reply from the automatic agent in between the two consecutive instructions.

10. The method of claim 1, wherein the at least one action comprises a sequence of simulated button pushes.

11. The method of claim 1, further comprising:
deploying the automatic agent to receive at least one human instruction from a human user; and
generating, by the automatic agent, at least one real action based on the at least one human instruction.

12. A system for training an automatic agent, comprising one or more processors and one or more non-transitory computer-readable memories coupled to the one or more processors and configured with instructions executable by the one or more processors to cause the system to perform operations comprising:
obtaining a secret task for a simulated user, wherein the secret task is unknown to the automatic agent;
obtaining, from the simulated user according to a user-side reinforcement learning (RL) policy, at least one instruction to complete the secret task;
generating, by the automatic agent, at least one action based on the at least one instruction and an agent-side RL policy;
determining rewards for the simulated user and the automatic agent in response to determining that the at least one action successfully completes the secret task, wherein the rewards comprise a user-side reward determined based on the at least one instruction and whether the at least one action successfully completes the secret task, and an agent-side reward determined based on the at least one action and whether the at least one action successfully completes the secret task; and adjusting the user-side RL policy based on the user-side reward and adjusting the agent-side policy based on the agent-side reward.

13. The system of claim 12, wherein:
the secret task comprises traveling to a target destination;
the at least one instruction comprises a plurality of tokens of simulated user input;
the at least one action comprises:
determining, by the automatic agent, a predicted destination based on one or more of the plurality of tokens of the simulated user input; and
determining, by the automatic agent, to travel to the predicted destination; and
the at least one action successfully completes the secret task when the predicted destination matches the target destination.

14. The system of claim 13, wherein the at least one action further comprises:
determining, by the automatic agent, a response template for a reply to the at least one instruction based on one or more of the plurality of tokens of the simulated user input;
determining, by the automatic agent, an Application Programming Interface (API) call and one or more parameters for the API call, wherein the one or more parameters are based on one or more of the plurality of tokens of the simulated user input; and
sending, by the automatic agent to the simulated user, the reply to the at least one instruction based on the response template and a response from the API call.

15. The system of claim 14, wherein the response from the API call comprises a latitude and longitude of the predicted destination.

16. The system of claim 12, further comprising:
deploying the automatic agent to receive at least one human instruction from a human user; and
generating, by the automatic agent, at least one real action based on the at least one human instruction.

17. A non-transitory computer-readable storage medium for training an automatic agent, configured with instructions executable by one or more processors to cause the one or more processors to perform operations comprising:
obtaining a secret task for a simulated user, wherein the secret task is unknown to the automatic agent;
obtaining, from the simulated user according to a user-side reinforcement learning (RL) policy, at least one instruction to complete the secret task;
generating, by the automatic agent, at least one action based on the at least one instruction and an agent-side RL policy;
determining rewards for the simulated user and the automatic agent in response to determining that the at least one action successfully completes the secret task, wherein the rewards comprise a user-side reward determined based on the at least one instruction and whether the at least one action successfully completes the secret task, and an agent-side reward determined based on the at least one action and whether the at least one action successfully completes the secret task; and
adjusting the user-side R policy based on the user-side reward and adjusting the agent-side policy based on the agent-side reward.

18. The non-transitory computer-readable storage medium of claim 17, wherein:
the secret task comprises traveling to a target destination;
the at least one instruction comprises a plurality of tokens of simulated user input;

the at least one action comprises:

determining, by the automatic agent, a predicted destination based on one or more of the plurality of tokens of the simulated user input; and determining, by the automatic agent, to travel to the predicted destination; and the at least one action successfully completes the secret task when the predicted destination matches the target destination.

* * * * *